June 30, 1931.  R. R. ELSTON  1,812,521
SANDER FOR BUSSES AND OTHER VEHICLES
Filed April 11, 1929　　2 Sheets-Sheet 1
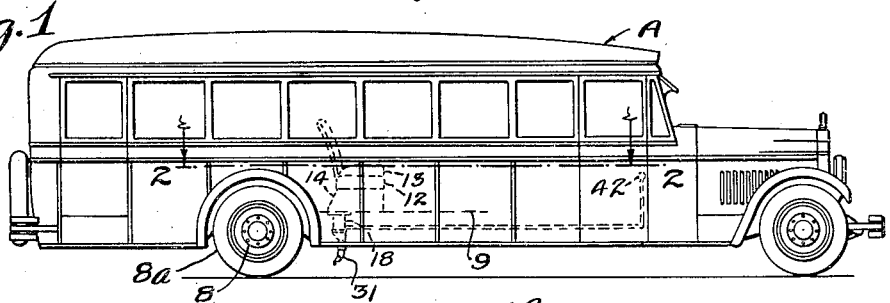
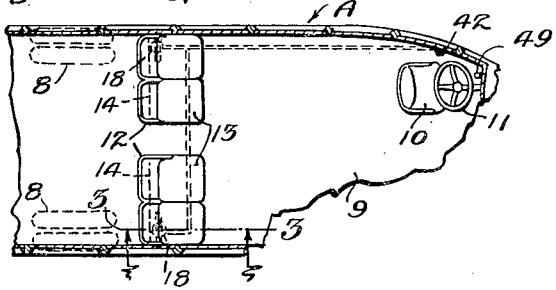
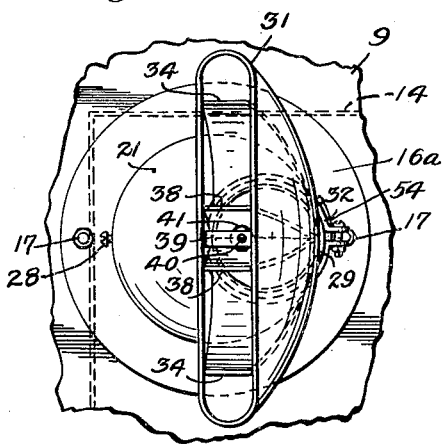
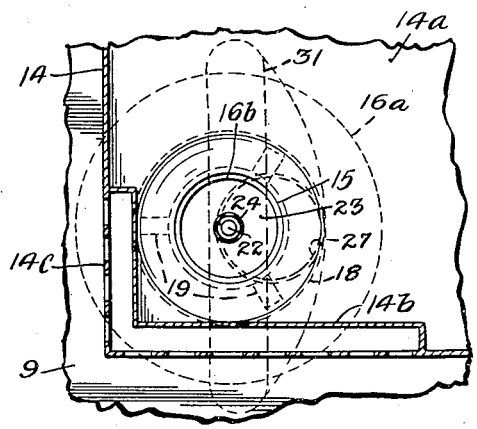
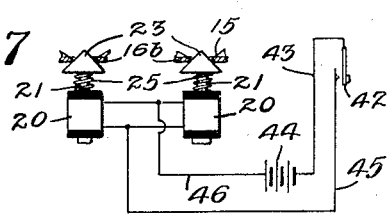
Inventor
Rue R. Elston
By his Attorneys
Williamson Rey & Williamson

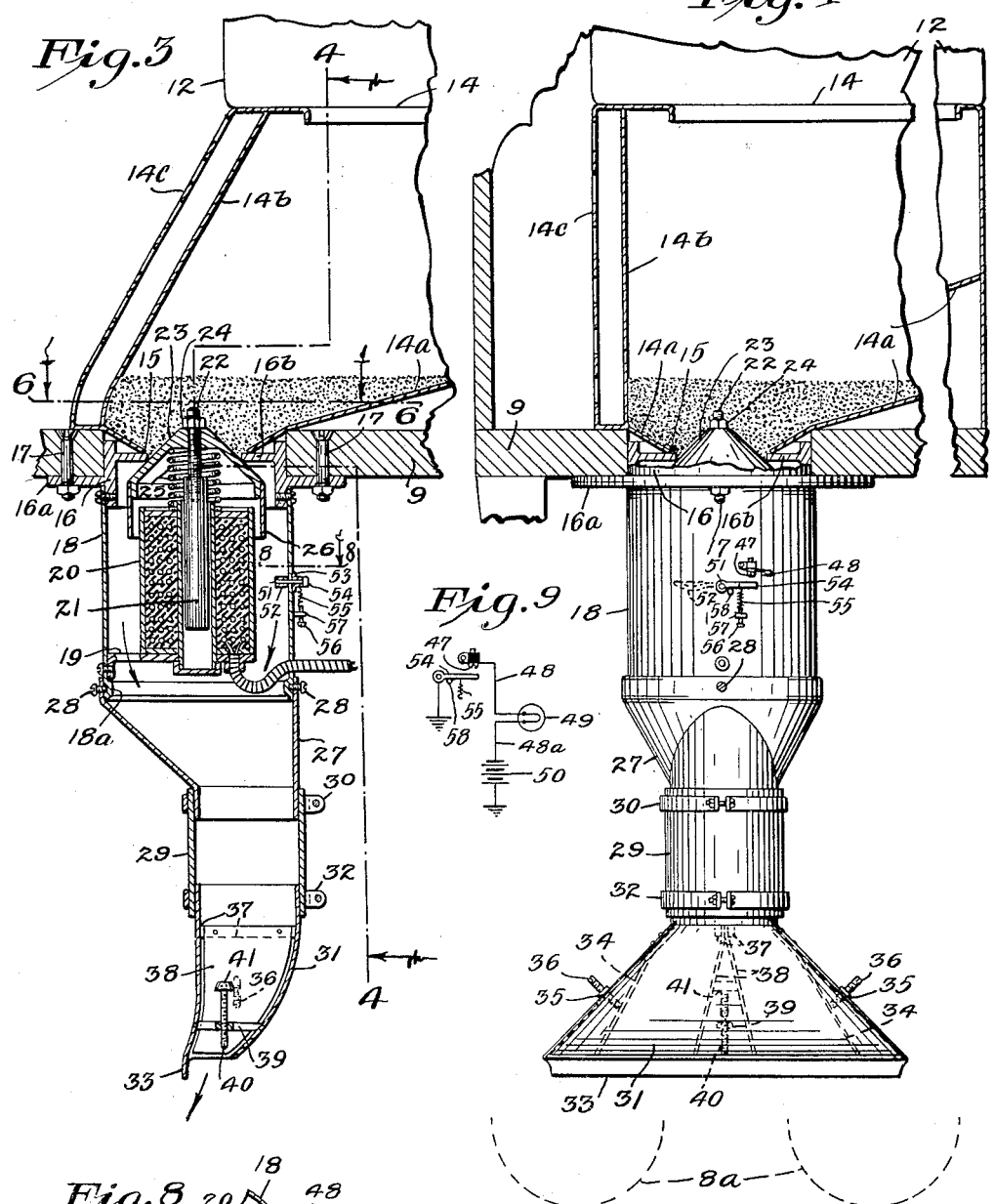

Patented June 30, 1931

1,812,521

UNITED STATES PATENT OFFICE

RUE R. ELSTON, OF MINNEAPOLIS, MINNESOTA

SANDER FOR BUSSES AND OTHER VEHICLES

Application filed April 11, 1929. Serial No. 354,258.

This invention relates to sanders for busses and other vehicles.

At the present time, bus companies in the northern cities spend a large amount of money every year during the winter time to pay for the sanding of icy streets at points where busses stop, to prevent the skidding of the busses. Many accidents are caused through the skidding of busses, automobiles and other vehicles on icy, greasy, muddy or wet pavements. Accidents through skidding, and the expense of sanding streets, could be largely eliminated if some practical device could be devised, which could be carried by a vehicle and could be operated, when desired, to supply sand or similar hard granular material onto a street immediately ahead of the path taken by the rear wheels of the vehicle.

It is the object of the present invention to provide such a device which can be carried on busses, automobiles or other vehicles, is of novel and improved design, and can be quickly operated by the driver of the vehicle on occasion to supply sand ahead of the traction wheels of the vehicle to prevent the vehicle from skidding on icy, greasy, muddy or wet pavements.

To these ends, the invention consists in the novel parts and novel combinations of parts hereinafter defined in the claims, and described in the following specification, made in connection with the accompanying drawings, wherein like reference characters refer to the same or similar parts throughout the various views and, in which, Fig. 1 is a view in side elevation illustrating an embodiment of the present invention, as applied to a bus;

Fig. 2 is a horizontal section through the bus taken on the line 2—2 of Fig. 1, as indicated by the arrows;

Fig. 3 is a vertical longitudinal section shown in enlarged scale and taken on the line 3—3 of Fig. 2, as indicated by the arrows;

Fig. 4 is a view taken substantially on the line 4—4 of Fig. 3, showing certain of the parts in section and certain of the parts in front elevation, the tires on a wheel of the vehicle being indicated by dotted lines;

Fig. 5 is a bottom view of the device;

Fig. 6 is a horizontal section taken on the line 6—6 of Fig. 3, as indicated by the arrows;

Fig. 7 is a wiring diagram of a portion of the device;

Fig. 8 is a horizontal section taken on the line 8—8 of Fig. 3, and

Fig. 9 is a wiring diagram of another portion of the device.

The device is illustrated as being applied to a bus A having rear wheels 8 provided with double tires 8a, floor 9, driver's seat 10, steering wheel 11, side seats 12 and seat cushions 13. Only two of the side seats 12 are illustrated, and these are the two seats which are situated immediately ahead of the rear wheels 8 of the bus.

In accordance with the present invention, the legs and seat bases for the seats 12 immediately forwardly of the rear wheels 8 of the bus are removed, and sand boxes 14 made in rights and lefts to fit the opposite sides of the bus are substituted therefor. Each sand box 14 is substantially rectangular in shape, to conform to the bottom of a seat 12, and is provided with a large opening at its top through which sand B may be supplied to the box. An opening 15 is provided at the outer rear corner of the box and the bottom 14a of the box slants downwardly toward the opening 15 to cause whatever sand there may be in the box to run downwardly to a point above the opening 15. The outer rear corner 14b of the box is forwardly and inwardly offset relative to the rear wall of the box and to the outer side wall of the box, as is best shown in Fig. 6, and a perforated corner section 14c formed continuous with the rear and outer side walls of the box is provided. The offsetting of the outer rear corner of the box is done in order that warm air from the interior of the bus may be supplied to the box 14 adjacent the opening 15, to cause the sand B in the box about the opening 15 to be always maintained in warm, free running condition. The rear wall of the box may be diagonally inclined as shown in Fig. 3, in order to form a suitable footrest for passengers occupying a seat immediately behind the seat where the sand box 14 is situated.

Quite a large opening is cut through the floor 9 of the bus below the opening 15 in the sand box, the opening in the floor being considerably larger than the opening 15 to receive a slanting portion of the bottom 14a of the box adjacent the opening 15 and to also receive a large ring 16 forming a valve seat. The ring 16 has an outwardly projecting flange 16a bearing against the bottom of the floor 9 and secured to the floor 9 as by means of bolts 17. Adjacent its upper end, the ring 16 has an inwardly projecting flange 16b upon which a portion of the bottom 14a, surrounding the opening 15, rests and forming a circular valve seat, the opening of which is practically coincident with the opening 15. A cylindrical conduit 18 is secured to the lower end of the ring 16 at the outer side thereof and projects downwardly for a short distance therefrom. Centrally disposed in the conduit 18 and mounted on several arms 19, secured to the sides of the conduit 18 adjacent the lower end thereof, is a vertically extending solenoid 20 having a movable iron core 21. A stud 22 is secured to the upper end of the core 21 and a conical valve 23 formed from copper or similar non-magnetic material, is preferably screw threaded on the upper end of the stud 22 and is adjustably held in place thereon by a lock nut 24. A coiled pressure spring 25 surrounding the upper end of core 21 and the stud 22, reacts between the lower side of the conical valve 23 and the upper end of the solenoid 20. A cylindrical flange is formed on the lower edge of the valve 23 and this flange is rabbeted to receive a skirt 26 which fits downwardly over the top portion of solenoid 20, to prevent the entrance of sand into the upper portion of the solenoid. An inwardly projecting groove 18a is provided adjacent the lower edge of the conduit 18, and a funnel shaped conduit 27 is attached to the lower end of the conduit 18 by small set screws 28 which fit within the groove 18a. The opening at the lower end of the conduit 27 is considerably reduced in diameter relative to the lower end of the conduit 18 and the center of the opening at the lower end of the funnel shaped conduit 27 is eccentrically disposed relative to the axial center of the conduit 18, as best illustrated in Figs. 3, 5 and 6. A flexible tube 29 formed from rubber or similar flexible material, is secured by a clamping ring 30 to the lower end of the funnel shaped conduit 27 and a spray nozzle 31 is secured by a clamping ring 32 to the lower end of the flexible tube 29. The spray nozzle 31 is of substantially cylindrical shape at its upper end to fit the flexible tube 29, and below the cylindrical portion thereof, the front and rear sides of the nozzle are pinched together, and are curved slightly rearwardly so that the side edges of the nozzle flare downwardly and outwardly, as best shown in Figs. 4 and 5. A lip 33 formed integral with or secured to the rear side of the spray nozzle 31, projects downwardly below the discharge opening at the bottom of the spray nozzle to protect this opening from accumulation of ice, snow and mud which may be thrown forwardly by the wheel 8 of the bus. Side deflector plates 34 formed from resilient spring material are secured at their upper ends to the inner surfaces of the two side edges of the nozzle at points where the nozzle first begins to flare outwardly, and these side deflector plates are under resilient tension to bear against the side edges of the spray nozzle. Small hubs 35 are secured to the outer sides of the side edges of the nozzle 31, and set screws 36 mounted in these hubs 35 project through the side edges of the nozzle and bear against the lower unsecured portions of the side deflector plates 34, to cause the deflector plates to adjustably define the width of throw of the sand as it is discharged from the spray nozzle 31. A pair of short bars 37 are mounted at the upper central portion of the nozzle 31 and extend between the front and rear sides of the nozzle, and a pair of central deflector plates 38 also formed from spring material, are secured at their upper ends to the short bars 37 and project downwardly at the central portion of the nozzle. The central deflector plates 38 are under resilient tension to move toward each other. A short bar 39 mounted adjacent the lower end of the nozzle 31 at the central portion thereof, and projecting between the front and rear sides of the nozzle, carries a set screw 40 provided at its upper end with a disk 41 of truncated conical shape, which projects between the two central deflector plates 38. It will be seen that by screwing, or unscrewing the set screw 40, that the disk 41 will act to either spread the lower free ends of the central deflector plates from each other or permit the same to move toward each other. The central deflector plates 38 will divide the stream of sand as it runs downwardly through the spray nozzle 31, and the extent of division of the two streams of sand as they strike the roadway, may be determined by adjustment of the screw 40. The lower edge of the discharge nozzle 31 will be disposed a few inches above the ground and directly ahead of one of the rear wheels 8 of the bus. If a bus having double tires 8a on each wheel 8 is used, the central division plates 38, bars 37, bar 39, set screw 40 and disk 41 will be used; if, however, but a single tire is used on a rear wheel 8 of the bus, these parts may be eliminated.

One of the sanders will be provided ahead of each rear traction wheel 8 of the bus, the sand boxes 14 for the two sides of the bus being made in rights and lefts and the other parts being alike. A press button electric switch 42 is provided at the forward portion of the bus adjacent the driver's seat 10 and the steering wheel 11 in a suitable position, to be easily operated by the bus driver. The button 42 will preferably be mounted on one side of the bus body, so that the driver can press the same either with his knee or with his finger. An electrical conductor 43 leads from one side of a battery 44 which may, if desired, be the battery of the bus to one contact of the switch 42. A second conductor 45 leads to the two solenoids 20 and a third conductor 46 leads from the two solenoids to the other side of the battery 44. The two solenoids will thus be connected in parallel and both the right hand and left hand solenoids 20 may be operated simultaneously when the press button switch 42 is operated.

Mounted at one side of the conduit 18 is an electrical conduit 47 insulated from the conduit 18 and connected by conductor 48 to a signal lamp 49, or similar electrical signal properly mounted as on the instrument board of the bus. Another conductor 48a leads from the lamp 49 to one terminal of a battery 50 which may or may not be the same battery as the battery 44, as desired. The other terminal of the battery 50 may be grounded as shown in Fig. 9. Adjacent but below the contact 47, a small horizontal stem 51 is mounted for rotation in the conduit 18 and this stem carries within the conduit 18 a shallow spoon 52. A small spacing collar 53 is secured to stem 51 outwardly from conduit 18 and secured to the outer end of the stem is a contact arm 54 adapted to engage the contact 47 when the spoon 52 is downwardly swung. To normally hold the spoon in substantially horizontal position, a small tension spring 55 is provided which has one end swivelled in contact arm 54 and its other end secured to a tension adjusting screw 56 mounted in a lug 57 below the arm 54. A stop pin 58 limits the downward swinging movement of arm 54.

In installing the device in a bus, the two spray nozzles 31 will both be situated some little distance ahead of the rear wheels 8 of the bus. In busses of different construction, it will be found that the opening 15 in the sand box 31, will not always fall directly in line with the longitudinal center of a rear wheel for the bus. For this reason, the opening at the bottom of the funnel shaped conduit 27 is eccentrically disposed relative to the opening at the bottom of the conduit 18.

By loosening the set screws 28 and rotating the funnel shaped conduit 27, on the conduit 18, the opening at the lower end of the conduit 27 can be disposed directly ahead of the central portion of a rear wheel of the bus, i. e., the discharge portion of the funnel shaped conduit 27, can be laterally adjusted, due to its eccentric position relative to the center of the conduit 18. The set screws 28 may then be tightened to properly hold the funnel shaped conduit 27 in the desired adjusted position. One of the clamping bands 30 or 32 may then be loosened and the spray nozzle can be properly set so that the flaring portion thereof extends transversely of the bus and the lip 33 is at the rear side of the nozzle. The two set screws 36 may then be adjusted in the hubs 35, so that the side deflector plates 34 limit the possible width of throw of the sand on the roadway ahead of the tires on a rear wheel to a width slightly greater than the distance between the outer and inner edges of the tire or tires 8a on the wheel. If two tires 8a are used on a rear wheel, the central deflector plates 38 will be provided together with the bars 37, bar 39, set screw 40 and disk 41, and the set screw 40 will be adjusted to spread the lower ends of central deflector plates 38, so that the sand as discharged will be divided into two streams and the spacing between these two streams will be slightly less than the spacing between the two tires 8a on the wheel 8 of the bus.

Preparatory to using the bus A, the bottoms of the seats 12 and the cushions 13 resting on the sand boxes 14 will be removed and dry, free running sand will be supplied through the large top opening in the two boxes 14 to fill the same, whereupon the bottoms of the seats 12 and seat cushions 13 may be put back in place. When the driver of the bus desires to stop quickly, without danger of a possible skid so as to prevent an accident, or to pull up at a regular stopping place, he will press the button 42 either with his knee or with one of his fingers. Electricity will then be supplied from the battery 44 to the two solenoids 20, and these solenoids will be almost instantaneously energized to depress the cores 21 against the tension of the springs 25. The two conical valves 23 will then be unseated from the valve seats 16, thereby permitting the sand B to run downwardly through the openings 15 over the conical valves 23 and skirts 26 into the conduits 18 and thence through the funnel shaped conduits 27, and tubes 29 into the spray nozzles 31. The sand will then be discharged from each spray nozzle in two streams, one stream of which will fall directly in the path of the outer tire 8a on one wheel and the other stream of which will fall directly in the path of the inner tire 8a of the same wheel. If the road surface be icy, greasy, muddy or wet, this sand will provide a good friction surface to prevent the traction wheels of the bus from skidding, thereby permitting the driver to come to a quick stop when he applies his brakes. The button 42 need only be instantaneously pressed to supply the necessary quantity of sand to the roadway, to prevent a dangerous skid. As soon as the button is released, the springs 25 will force the conical valves upwardly to again bear against the valve seats 16, thereby cutting off the supply of sand and preventing wastage of the same. The sand supplied to the sand boxes 14 will preferably be dry, free running sand and due to the fact that the warm air from the bus may circulate freely between the offset inner and rear corners 14b of the boxes through the perforations in the corner portions 14c, the sand will always be kept in free running, unfrozen condition about the valves 23, so that the same cannot clog in the openings 15. As the sand adjacent the openings 15 is used up, the slanting bottoms 14a of the boxes 14 will allow the sand to slide downwardly adjacent the openings 15   It will, of course, be understood that any type of free running, granular material may be substituted for sand, such as cinders, crushed rock etc.

As sand or other granular material runs downwardly from the opening 15 through the conduit 18, a portion of the sand will strike the spoon 52 to weight the same and swing the same downwardly against the tension of spring 53 to carry the contact arm 54 into engagement with contact 47. The arm 54 which is indirectly connected to conduit 18 will then form a ground connection to complete the circuit from battery 50 to the signal lamp 49, whereupon the lamp will light and indicate to the driver of the bus that sand is flowing. When the sand ceases to flow through the conduit 18, the spring 55 will depress the arm 54 to break the circuit so established. If no sand flows through the conduit 18 when button 42 is pressed, the lamp 49 will not light and the driver will know that he is out of sand and he can then secure a fresh supply of sand at the earliest opportunity. It will be understood that any desired type of indicator can be substituted for the indicator shown and described to indicate to the driver the condition of his sand supply.

Although the present device is illustrated as being applied and constructed particularly for use on busses, it will be understood that the device is capable of being used on any type of automobile, or other vehicle, by slightly changing the construction thereof without departing from the scope of the present invention.

The construction is cheap and simple and by use of the solenoid actuated valve, a very quick action can be obtained and means for actuating the valve can be all situated directly in the conduit 18 running downwardly below the discharge opening in the sand box.

It will, of course, be understood that various changes may be made in the form, details, arrangement and proportions of the various parts without departing from the scope of the present invention.

What is claimed is:

1. A sander for vehicles, comprising a sand box adapted to be mounted on the vehicle, said box having an opening therethrough, a conduit mounted below said opening and projecting downwardly therefrom, a spray nozzle secured to the lower end of said conduit, a valve normally closing the opening in said box but adapted to be operated to move out of said opening to permit sand carried in said box to run downwardly into said conduit, a spray nozzle and deflector plates in said nozzle dividing the same at the center thereof to cause the sand to be discharged from said nozzle in two streams, one stream for each tire of a double tired wheel.

2. A sander for vehicles, having in combination, a sand box adapted to be mounted on the vehicle ahead of a wheel thereof, said box having an opening therethrough, a conduit mounted below said opening and projecting downwardly therefrom, a spray nozzle secured to said conduit and adapted to be placed a short distance ahead of the wheel to which sand is to be supplied, a valve adapted to admit or cut off the flow of sand from said box through said opening into said conduit, a pair of spring deflector plates secured at their upper ends to said nozzle and projecting between the front and rear walls of the nozzle to divide the sand as it flows therethrough, and means for adjusting the spacing of the lower ends of said spring deflector plates to vary the divergence of spread of the sand as it is discharged from said nozzle.

3. A sander for vehicles, having in combination, a sand box adapted to be mounted on the vehicle ahead of a wheel to which sand is to be supplied, said box having an opening therethrough, a conduit mounted below said opening and projecting downwardly therefrom, a spray nozzle secured to said conduit and adapted to be placed a short distance ahead of the wheel to which sand is to be supplied, a valve adapted to admit or cut off the flow of sand from said box through said opening into said conduit, spring deflector plates secured at their upper ends to the edges of said nozzle and extending between the front and rear walls of the nozzle and means for adjusting the position of the lower ends of said plates to and from the side edges of the nozzle to vary the width of spread of the sand as discharged from said nozzle.

4. A sander for vehicles, having in combination, a sand box adapted to be mounted on the vehicle ahead of a wheel to which sand is to be supplied, said box having an opening therethrough, a conduit mounted below said opening and projecting downwardly therefrom, a spray nozzle secured to said conduit and adapted to be placed a short distance ahead of the wheel to which sand is to be supplied, a valve adapted to admit or cut off the flow of sand from said box through said opening into said conduit, a pair of deflector plates secured at their upper ends in the center portion of the upper end of said nozzle, projecting downwardly between the front and rear sides of the nozzle to divide the sand into two streams as it is discharged from said nozzle, means for adjustably spreading the lower ends of said plates to vary the spacing between the two streams, a second pair of deflector plates mounted at their upper ends adjacent the top edges of the spray nozzle, extending between the front and rear walls of the nozzle and projecting downwardly therein, and means for adjustably positioning the lower ends of said last mentioned plates to and from the side edges of the nozzle to adjustably vary the width of the spread of sand as discharged from said nozzle.

5. A sander for vehicles, having in combination, a sand box adapted to be mounted on the vehicle and having an opening in the bottom thereof, a conduit running downwardly from said box below said opening, a valve normally closing said opening but adapted to be moved out of said opening to permit sand to flow from said box into said conduit, a funnel-shaped conduit mounted at the lower end of said first mentioned conduit and having an opening, the center of which is eccentrically disposed relative to the center of the opening through said conduit, said funnel-shaped conduit being adapted to be rotated respective to said first mentioned conduit and secured in a desired rotated position, and a spray nozzle secured to the lower end of said funnel-shaped conduit, said spray nozzle being adapted to be disposed ahead of a wheel of the vehicle and the opening in said funnel-shaped conduit being eccentrically arranged relative to the opening in said first mentioned conduit in order that lateral adjustment of said spray nozzle may be made relative to the wheel of the vehicle.

6. A sander for vehicles, having in combination, a sand box adapted to be mounted in the vehicle and provided with an opening through the bottom thereof, a valve seat disposed below said opening, a conduit extending downwardly from said valve seat, a conical valve mounted for vertical movement in said conduit and adapted to seat against said valve seat, a solenoid mounted in the central portion of said conduit for operating said valve, and a spray nozzle secured to the lower portion of said conduit and adapted to be positioned ahead of one wheel of a vehicle.

7. The combination with a sander for vehicles, of an indicator for indicating to the driver of the vehicle the condition of the sand supply.

8. The combination with a sander for vehicles, of an indicator adapted when the sander is operated to indicate to the driver of the vehicle whether sand is being distributed from the sander.

9. A sander for vehicles, comprising a sand supply box, a sand distributing conduit leading from said box and adapted to be situated ahead of a rear wheel of a vehicle, a valve in said conduit controlling the distribution of sand therethrough and an indicator adapted to be operated when sand flows through said conduit.

10. A sander for vehicles comprising a sand conduit, having a valve seat at its upper end to which sand may be supplied, a solenoid centrally mounted in said conduit below said valve seat and a valve operated by said solenoid and adapted to cooperate with said valve seat to admit and cut off the passage of sand through said conduit.

11. A sander comprising a sand conduit, having a valve seat at its upper end to which sand may be supplied, a solenoid mounted in said conduit below said valve seat in centrally spaced relation from the sides of said conduit, said solenoid having a core normally projecting upwardly therefrom and a conical valve carried by said core above said solenoid and adapted to cooperate with said valve seat to admit and cut off the passage of sand through said conduit, said valve being adapted to deflect the sand running through said conduit from the top of said solenoid.

12. The structure defined in claim 11, and a skirt carried by said valve and projecting downwardly therefrom to surround the upper end of said solenoid.

13. A sander for vehicles comprising a sand conduit having an opening at its upper end into which sand may be delivered, a solenoid centrally disposed in said conduit and having a core, a valve carried by said core and adapted to close off said opening and a skirt carried by said valve and surrounding the upper end of said solenoid to protect the same from sand as it runs through said conduit.

14. A sander for vehicles comprising a sand distributing conduit, a valve in said conduit controlling the distribution of sand therethrough, a spoon pivotally mounted in said conduit below said valve, resilient means normally urging said spoon upwardly to horizontal position and an indicator adapted to be operated when said spoon is depressed, the weight of sand flowing through said conduit and striking said spoon being adapted to overcome the tension of said resilient means to depress said spoon.

15. A sander for vehicles comprising a sand distributing conduit, a valve in said conduit controlling the distribution of sand therethrough, a spoon pivotally mounted in said conduit below said valve, resilient means normally urging said spoon upwardly to horizontal position, a source of electricity, an electrically operating signalling device and means for establishing an electrical circuit from said source to said signalling device when said spoon is depressed, the weight of sand against said spoon when flowing through said conduit being sufficient to depress said spoon against the action of said resilient means.

In testimony whereof I affix my signature.

RUE R. ELSTON.